(12) United States Patent
Halbweiss et al.

(10) Patent No.: US 8,096,601 B2
(45) Date of Patent: Jan. 17, 2012

(54) REAR WINDOW IN A REAR ROOF SECTION OF AN OPENABLE ROOF VEHICLE

(75) Inventors: Thomas Halbweiss, Remseck (DE); Wojciech Wezyk, Sindelfingen (DE)

(73) Assignee: Magna Car Top Systems GmbH, Bietigheim-Bissingen (DE)

( * ) Notice: Subject to any disclaimer, the term of this patent is extended or adjusted under 35 U.S.C. 154(b) by 170 days.

(21) Appl. No.: 12/343,677

(22) Filed: Dec. 24, 2008

(65) Prior Publication Data

US 2009/0160212 A1    Jun. 25, 2009

Related U.S. Application Data

(63) Continuation-in-part of application No. 11/425,842, filed on Jun. 22, 2006, now abandoned.

(30) Foreign Application Priority Data

Jun. 22, 2005    (DE) .................. 10 2005 029 301

(51) Int. Cl.
  *B60J 7/00*    (2006.01)
(52) U.S. Cl. ................................. 296/107.07
(58) Field of Classification Search ............. 296/107.07, 296/146.14, 29, 146.1, 201, 145, 95.1, 107.08, 296/108; 280/730.2; 160/370.21
  See application file for complete search history.

(56) References Cited

U.S. PATENT DOCUMENTS

| | | | | |
|---|---|---|---|---|
| 2,495,022 A * | 1/1950 | Robbins | .................... | 296/145 |
| 2,560,493 A * | 7/1951 | Spring | .................... | 296/145 |
| 2,963,316 A * | 12/1960 | Matthews | .................... | 296/152 |
| 3,091,494 A * | 5/1963 | Cohen | .................... | 296/107.07 |
| 3,191,989 A * | 6/1965 | McCornack | .................... | 296/145 |
| 3,312,023 A * | 4/1967 | Zell | .................... | 52/203 |
| 3,388,945 A * | 6/1968 | Kevelin et al. | .................... | 296/145 |
| 3,462,189 A * | 8/1969 | Kavthekar | .................... | 296/146.16 |
| 4,139,234 A * | 2/1979 | Morgan | .................... | 296/201 |
| 4,543,747 A * | 10/1985 | Kaltz et al. | .................... | 49/249 |
| 4,572,570 A * | 2/1986 | Trucco | .................... | 296/107.07 |
| 4,611,849 A * | 9/1986 | Trenkler | .................... | 296/201 |
| 4,792,180 A * | 12/1988 | Jacobsen et al. | .................... | 296/210 |
| 4,799,727 A * | 1/1989 | Robbins et al. | .................... | 296/107.07 |
| 4,847,977 A * | 7/1989 | Gold | .................... | 29/446 |
| 5,040,844 A * | 8/1991 | Stolz et al. | .................... | 296/107.07 |
| 5,061,332 A * | 10/1991 | Stolz et al. | .................... | 156/94 |
| 5,074,610 A * | 12/1991 | Tamura et al. | .................... | 296/93 |
| 5,088,787 A * | 2/1992 | Gross | .................... | 296/93 |
| 5,110,178 A * | 5/1992 | Love | .................... | 296/218 |
| 5,253,915 A * | 10/1993 | Schnader et al. | .................... | 296/107.12 |
| 5,271,655 A * | 12/1993 | Ball et al. | .................... | 296/146.14 |
| 5,310,236 A * | 5/1994 | Tamura et al. | .................... | 296/93 |
| 5,339,584 A * | 8/1994 | Ohtake et al. | .................... | 52/208 |
| 5,454,615 A * | 10/1995 | Schnepf | .................... | 296/95.1 |

(Continued)

FOREIGN PATENT DOCUMENTS

DE    43 09 607    9/1994

(Continued)

*Primary Examiner* — Kiran B. Patel
(74) *Attorney, Agent, or Firm* — Brooks Kushman P.C.

(57) ABSTRACT

A rear window for a flexible rear roof section of an openable roof vehicle. The rear window is comprised of a transparent plastic material such as a polycarbonate material, and a fastening section that connects the rear window to the flexible covering of the open roof vehicle. The fastening section forms a single piece with the rear window and is offset relative to the plane of the rear window.

7 Claims, 2 Drawing Sheets

U.S. PATENT DOCUMENTS

| | | | | |
|---|---|---|---|---|
| 5,460,424 A * | 10/1995 | Wagner | | 296/146.14 |
| 5,464,265 A * | 11/1995 | Hemmis et al. | | 296/146.14 |
| 5,558,390 A * | 9/1996 | Hemmis et al. | | 296/146.14 |
| 5,600,922 A * | 2/1997 | Stolz | | 52/74 |
| 6,082,807 A * | 7/2000 | Hartmann et al. | | 296/107.07 |
| 6,102,467 A * | 8/2000 | Laurain et al. | | 296/107.07 |
| 6,170,901 B1 * | 1/2001 | Hartmann et al. | | 296/107.01 |
| 6,231,110 B1 * | 5/2001 | Umeda et al. | | 296/146.14 |
| 6,260,904 B1 * | 7/2001 | Hartmann et al. | | 296/107.01 |
| 6,270,146 B1 * | 8/2001 | Hirmer et al. | | 296/146.14 |
| 6,302,470 B1 * | 10/2001 | Maass et al. | | 296/107.07 |
| 6,464,285 B1 * | 10/2002 | Schutt | | 296/107.07 |
| 6,578,898 B2 * | 6/2003 | Rothe et al. | | 296/107.07 |
| 6,688,669 B2 * | 2/2004 | Foelster et al. | | 296/107.01 |
| 6,764,129 B2 * | 7/2004 | Kose | | 296/146.15 |
| 6,767,044 B2 * | 7/2004 | Tohda et al. | | 296/107.01 |
| 6,814,385 B2 * | 11/2004 | Fujiwara | | 296/93 |
| 6,866,322 B2 * | 3/2005 | Willard | | 296/107.01 |
| 6,935,677 B2 * | 8/2005 | Nania | | 296/146.14 |
| 7,086,693 B1 * | 8/2006 | Huisman | | 296/215 |
| 7,114,769 B2 * | 10/2006 | Storc et al. | | 296/219 |
| 7,434,865 B2 * | 10/2008 | Herz et al. | | 296/107.07 |
| 7,600,804 B2 * | 10/2009 | Froschle | | 296/107.07 |
| 2009/0091155 A1 * | 4/2009 | Rawlings | | 296/107.07 |

FOREIGN PATENT DOCUMENTS

| | | |
|---|---|---|
| DE | 196 42 648 | 4/1998 |
| DE | 199 56 330 | 5/2001 |
| DE | 101 06 738 | 5/2003 |

* cited by examiner

REAR WINDOW IN A REAR ROOF SECTION OF AN OPENABLE ROOF VEHICLE

CROSS-REFERENCE TO RELATED APPLICATIONS

This application claims priority to German application Serial No. 10 2005 029 301.8 filed Jun. 22, 2005, and is a continuation-in-part of U.S. application Ser. No. 11/425,842, filed Jun. 22, 2006.

BACKGROUND OF THE INVENTION

1. Field of the Invention

The present invention relates to a rear window in a rear roof section of an openable roof vehicle.

2. Background Art

Rear windows in the rear roof section of an openable roof vehicle give motor vehicle drivers the ability to see clearly toward the rear, even when the vehicle roof is closed. Rear windows in the rear roof section of an openable roof vehicle have a fastening section to connect the rear window to a flexible covering of the vehicle roof.

German Application DE 41 29 492 A1 discloses a method for connecting a rear window with the flexible covering of an openable roof vehicle. This patent requires the use of an adhesive that connects the rear window to a frame. Bolts are used to connect the frame to the flexible covering of the vehicle roof. The disadvantage with this patent is that the frame and the bolts necessary to fasten the flexible covering not only are clearly visible but also protrude. Thus, this design not only spoils the visual appearance, but also could represent a safety risk.

German application DE 42 10 487 A1 discloses another way to connect a rear window with the flexible covering in an openable roof vehicle. However, this patent requires additional design and assembly expense in order to cover the necessary functional parts and additional interior covering.

German application DE 196 28 107 C1 discloses a third method of connecting a rear window with the flexible covering of an openable roof vehicle. This patent requires the rear window be connected with the flexible covering of the vehicle roof by means of an additional sealing frame engaging two plastic profiles. Here, the additional sealing frame and plastic profiles are required to connect the rear window with the flexible covering. The disadvantage with this patent is that these functional connecting elements are clearly visible from both the inside and outside.

The present invention is an improvement over the above references, as summarized below.

SUMMARY OF THE INVENTION

One objective of this invention is to improve the visual appearance and integration of the functional parts necessary for connecting the rear window with the covering of the vehicle roof of an openable roof vehicle.

One advantage of the invention is that the outside surface of the rear window is flush with the flexible covering of the openable vehicle roof in the area of the fastening section. The entire outside surface is smooth except for the visible seam that represents the flush transitional area between the outside rear window and the flexible covering. The invention provides an advantage in visual appearance because the transitional area is flush with the roof surface.

Another advantage of the invention is that the rear window may have different wall thicknesses. The rear window can have a lower wall thickness toward its middle for weight optimization. In addition, the fastening section of the rear window can have a thinner wall thickness. Furthermore, this step in the thickness of the rear window allows an offset that accommodates the functional parts that connect the flexible covering and the rear window. To accomplish this seamless transition, the wall thickness of the rear window can be conically tapered down to a thickness close to zero in the direction of the flexible covering. This offset creates a seamless transition between the rear window and the flexible covering from the inside.

A further advantage of the invention is that the fastening section of the rear window may have an offset that lies in a plane that is different than that of the rear window. This offset allows the rear window to have the same wall thickness near its fastening section, but requires a drop or bend in order to accommodate the flexible covering and/or the necessary functional elements. Thus, the offset allows a flush connection between the rear window, the flexible covering, and the functional elements.

Another advantage of the invention is that the fastening section may have an upward bend which makes the rear window more stable, and provides a better connection between the rear window and the flexible covering. The upward bend can be at a certain angle, preferably up to 90°. In addition, the upward bend is provided in the fastening section of the rear window. Furthermore, the flexible covering of the vehicle roof should be located on the upward bend.

Another advantage of this invention is that the rear window can be produced using a polycarbonate (PC) injection molding. Furthermore, polycarbonate has properties which are favorable for vehicle construction and is easy to provide in an injection molded process. In addition, the injection mold can be designed in such a way that the rear window produced has a shape that is beneficial for later installation in an openable roof vehicle. Some examples of a beneficial injection molded rear window include an offset, a step, and/or different wall thickness. Therefore, economical benefits are gained in using an injection mold in the production of the rear window.

Other advantages and improvements achieved by the Applicants' invention will be apparent to one of ordinary skill in the art in view of the attached drawings and following detailed description of the illustrated embodiment.

DETAILED DESCRIPTION OF THE PREFERRED EMBODIMENT

Figure 1:
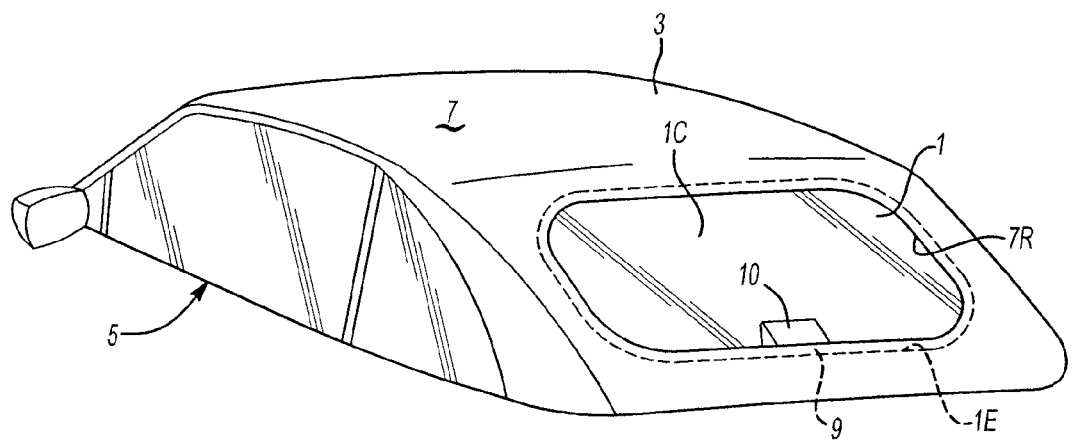
FIG. 1 is a perspective view of a vehicle that has a rear window in a rear roof section of an openable roof vehicle.

FIG. 1 shows a rear window 1, that is adapted to be installed into an openable vehicle roof 3 of a vehicle 5. FIG. 1 shows the vehicle 5 with the openable vehicle roof 3 in the closed position. The vehicle interior is covered by a vehicle roof 3 that is comprised of a flexible covering 7 that defines a rear opening 7R. The rear window 1 has a fastening section 9 where the rear window 1 is connected with the flexible covering 7 of the vehicle roof 3. The fastening section 9 is directly secured to the flexible covering 7 around the entire periphery 1E of the rear window 1 with an adhesive, glue, or by heat fusion (such techniques being jointly referred to as "adhesively bonded"). Additional fasteners may also be provided, but are not necessary and may be eliminated. The additional fasteners may include clamps, clips, frames, bolts, rivets, or similar objects.

Figure 2:
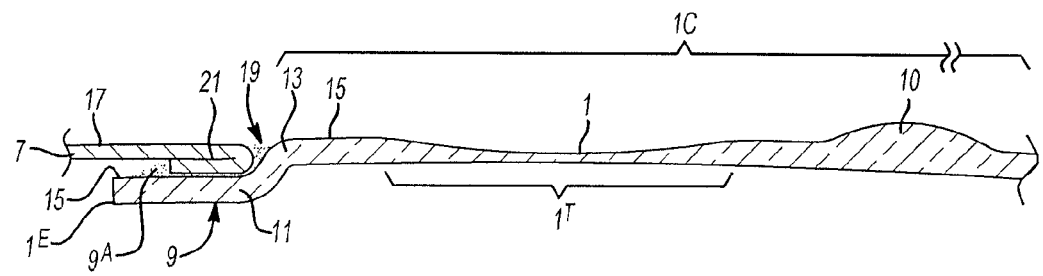
FIG. 2 is a cross-section view of an integrated rear window having an offset in the area of the fastening section of the rear roof section.

FIG. 2 shows a partial sectional illustration of the fastening section 9 of the rear window 1 that is adhesively bonded, for example, by an adhesive 9A to the flexible covering 7. The rear window 1 is made of a transparent material, so that it allows the driver a clear view toward the rear when vehicle roof 3 is closed. The transparent material used is a polycarbonate which is processed by injection molding. The injection molded polycarbonate parts can have drops, bends, changes in the wall thickness, and other advantageous embodiments. This makes it possible to reduce the weight by varying the material thickness toward the middle of the window. In areas where the geometric and kinematic properties of the vehicle roof 3 expose the rear window 1 to lower loads, it can have a relatively thin wall thickness as indicated by "$1^T$". In addition, in some areas it is also possible to vary the wall thickness of the rear window in such a way as to produce optics that affect the path of the light. For example, it would be possible to integrally form a wide-angle lens 10 in a localized area of the rear window 1 that could reduce the existing blind spot of the vehicle 5. The localized area may have a convex or concave configuration formed during the injection molding process that forms the rear window 1.

FIG. 2 further illustrates one approach to providing an offset 11 between the rear window 1 and the fastening section 9. The offset 11 is realized by means of a bend 13. The bend 13 is designed in such a way that it is recessed relative to the central portion 1C of the outer surface 15 of the rear window 1. The offset extends approximately parallel to the central portion 1C of the rear window. When viewed in the orientation of FIG. 2, the fastening section 9 of rear window 1 is located to the left of the bend 13 of the rear window 1. The offset 11 is designed in such a way that the flexible covering 7 is flush with the periphery 1E of the rear window 1. The offset 11 allows an outer surface 17, of the flexible covering 7, and an outer surface 15, of the rear window 1, to be flush at a seam 19 where they meet. As shown in FIG. 2, the flexible covering 7 is reversely turned around the entire periphery 1E of the rear window 1 to form a fold 21.

Figure 3:
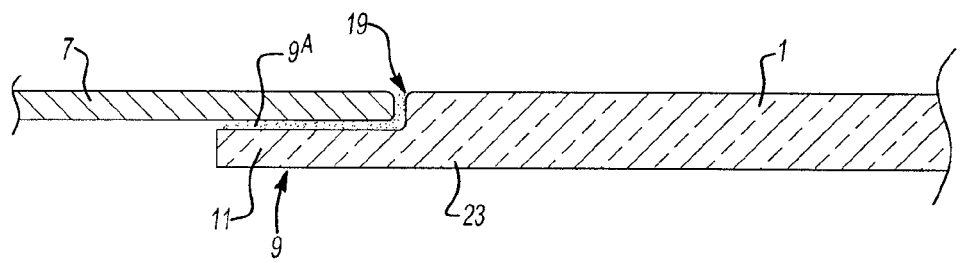
FIG. 3 is a cross-section view of a rear window, similar to FIG. 2, having a material thickness offset formed in the rear window.

FIG. 3 shows a further illustration of the rear window 1. In an area of the seam 19 where the fastening section 9 meets the rear window 1. A step in material thickness is provided by a peripheral edge 1E that reduces the thickness of the window around the peripheral edge 1E, producing a step 23 in the rear window. The offset 11 is provided by the step 23 in which is received the flexible covering 7 and the adhesive 9A. The outer surfaces 17 and 15 of the covering 7 and the rear window 1 are flush where they meet at the seam 19. The height of the step 23 of the rear window 1 can be adapted to the thickness of the covering 7. As shown in FIG. 3, the flexible covering 7 is not reversely turned and is a single thickness of the flexible covering 7. The depth of the offset 11 at the step 23 may be varied to reduce the visibility of the seam 19 that would otherwise visually stand out without the offset.

Figure 4:
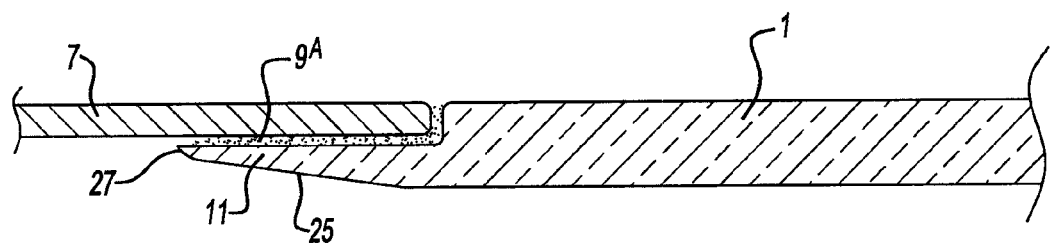
FIG. 4 is a rear window view similar to those shown in FIGS. 2 and 3 having the offset formed in the rear window by a step in material thickness, and wherein the material thickness of the rear window tapers toward the flexible covering of the rear roof section.

FIG. 4 illustrates another embodiment of the rear window 1 in which the offset 11 of the rear window 1 may contain a taper 25 in the thickness of the material forming the rear window 1. If no head liner is provided, the taper 25 of the rear window 1 will normally be visible from the vehicle interior. Taper 25 makes it possible for the interior transition 27 between the rear window 1 and the flexible covering 7 to have a substantially flush visual appearance.

Figure 5:
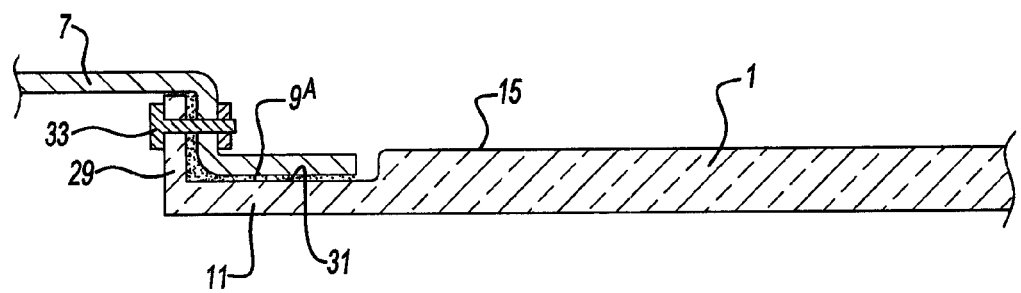
FIG. 5 is a rear window similar to those shown in FIGS. 2-4 having the offset formed in the rear window that has a step in material thickness on one end of the offset and a 90° upward bend on the other end of the offset.

FIG. 5 illustrates an upward bend 29 at the offset 11 of the rear window 1 and outboard of the fastening section 9. The area of the surface 31 of the offset 11 located in the fastening section 9 of the rear window 1 can be adhesively bonded by adhesive, glue, fusion, heat, or similar techniques 9A. The upward bend 29 located at the outer edge 1E of rear window 1 stands at an angle to outer surface 15 or to surface 31. It is preferable for the upward bend 29 to form an angle of up to 90° relative to surfaces 15 and 31. The upward bend 29 can be further secured with additional fasteners 33 to fix the covering 7 to the rear window 1.

The connection described in FIGS. 2 through 5 between the flexible covering 7 and the rear window 1 can be further supplemented by an additional interior connection point, corresponding fastening section, and corresponding offset. The connection point can be provided in the vehicle interior opposite the offset 11, and can be used to fasten an interior ceiling, or head liner, of the vehicle 5 to the vehicle roof 3. This connection point and head liner may be provided to cover the functional elements of the connection and the functional elements of the kinematics which are necessary for raising and lowering the vehicle roof 3.

While embodiments of the invention have been illustrated and described, it is not intended that these embodiments illustrate and describe all possible forms of the invention. Rather, the words used in this specification are words of description rather than limitation, and it is understood that various changes may be made without departing from the spirit and scope of the invention.

What is claimed is:

1. A rear window in combination with a rear roof section of an openable roof vehicle having a flexible covering, the combination comprising:
   the flexible covering defining a rear opening;
   the rear window being formed of a transparent plastic material and having a fastening section for connecting the rear window to the flexible covering, the fastening section borders a central portion of the rear window; and
   wherein the fastening section is integrally formed with the rear window and is offset relative to an outer surface of the central portion of the rear window, the fastening section is offset and directly receives the flexible cover around the rear opening without any intervening structural member, and is bonded with an adhesive to the outer surface of the rear window at the fastening section, and wherein the flexible cover is not embedded in the rear window, wherein an outer surface of the flexible covering at the rear opening is flush with the outer surface of the rear window.

2. The combination of claim 1 wherein the rear window is manufactured by injection molding.

3. The combination of claim 1 wherein the central portion of the rear window defines a thin wall thickness area that is thinner than the fastening section.

4. The combination of claim 1 wherein offset in the area of the fastening section is equal to the thickness of a portion of the flexible covering defining the rear opening.

5. The combination of claim 1 wherein the fastening portion is defined by a bend formed around a peripheral edge of the rear window.

6. The combination of claim 1 wherein the rear window is made of polycarbonate material.

7. The combination of claim 1 wherein the rear window has a wide angle lens that is integrally formed by injection molding the rear window.

* * * * *